May 1, 1934.  A. V. MERSHON  1,957,222
TESTING AND SORTING OF ELECTRICALLY CONDUCTING PARTS
Filed Sept. 30, 1932
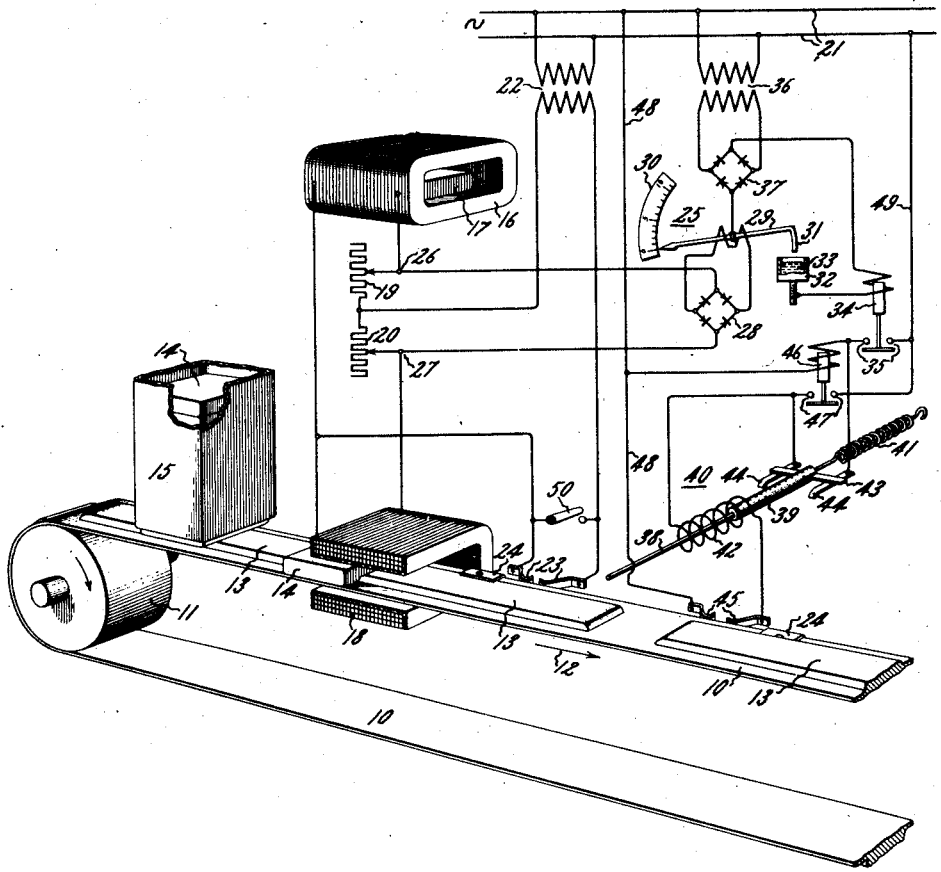
Inventor:
Alfred V. Mershon,
by Chas. E. Tullar
His Attorney Patented May 1, 1934

1,957,222

UNITED STATES PATENT OFFICE 1,957,222

TESTING AND SORTING OF ELECTRICALLY CONDUCTING PARTS

Alfred V. Mershon, Schenectady, N. Y., assignor to General Electric Company, a corporation of New York Application September 30, 1932, Serial No. 635,582

6 Claims. (Cl. 209—81)

My invention relates to a testing and rejecting device for electrically conducting parts. The principal object of my invention is to provide a device that will test an electrically conducting part by electrically comparing it with a standard electrically conducting part of the same kind, and that will automatically reject the tested part when its chemical composition and/or its physical characteristic is appreciably different from that of the standard part. A further important object of my invention is to provide a device that will perform the above described functions with many different kinds of electrically conducting parts without altering, adjusting or rebuilding any part of the device when changing from operation with one kind of an electrically conducting part to operation with another kind. A more specific object of my invention is to provide a device that will consecutively test a plurality of packages carried by a continuously moving conveyor, each package containing one or more metallic parts and each package being tested by electrically comparing it with a standard package containing a predetermined number of such parts, and that will automatically reject each tested package that contains a number of parts different from that contained in the standard package. A further object of my invention is to provide a device that will compare an electrically conducting part with a standard electrically conducting part and that will indicate the chemical composition and/or the physical characteristic of the tested part as compared to that of the standard part, and that will also compare a package containing one or more electrically conducting parts with a package containing a predetermined number of such parts and that will indicate the number of such parts in the tested package.

Modern industry manufactures large quantities of small and medium size metallic parts. Some of these parts are used in the factory where they are made for building various articles; some parts are manufactured for sale in units; and other parts are put up in packages at the factory, each package containing a number of small parts and sold to the public in the original package. An example of the latter is packages of safety-razor blades. The demand for high quantity production and low manufacturing cost led to the use of continuously moving conveyors for transporting these parts in the factory from one operation to the next until they reach the assembly room, if they are used in building some article, or until they reach the shipping room, if they are sold in units or several parts in a package. Precision requirements of present day manufacturing practice demands that the magnetic, chemical, or mechanical characteristic of each part reaching the assembly room or shipping room should not be appreciably different from that of a standard metallic part. In the case of packages containing one or more metallic parts, it is obviously desirable that each package reaching the shipping room should contain the correct number of parts. The combination of the above stated requirements led to a demand in industry for a device that will consecutively test a plurality of metallic parts carried by a continuously moving conveyor and that will automatically reject any part whose chemical composition or whose physical characteristic is appreciably different from that of a standard metallic part, and/or that will consecutively test a plurality of packages carried by a continuously moving conveyor, each package containing one or more metallic parts, and that will automatically reject each package containing the wrong number of parts. Furthermore, industry demands a device that will perform the above described functions with many different kinds of metallic parts without altering, adjusting, or rebuilding any part of the device when changing from operation with one kind of a metallic part to operation with a different kind of metallic part.

My invention provides such a device. Briefly described, a preferred embodiment thereof consists of a Wheatstone bridge having two air core solenoids respectively connected in two of its arms, one solenoid being adapted to receive the standard metallic part or package as its core and the second solenoid being adapted to receive the metallic part or package carried by the conveyor as its core, the second solenoid being so positioned that the metallic parts or packages carried by the conveyor consecutively pass therethrough. The difference of potential across the Wheatstone bridge, caused by an unbalance thereof, controls the operation of electroresponsive means which in turn control the operation of an electromagnet having a movable plunger adjacent to the conveyor for ejecting therefrom a tested metallic part or package. The arrangement is such that after a metallic part or package passes through the second solenoid it comes in front of the plunger and the electromagnet becomes energized and ejects the part or package from the conveyor when the particular characteristic under investigation of this metallic part is appreciably different from that of the standard part in the first solenoid, or when the number of parts in this package is different from that in the package in the first solenoid.

In U. S. patent application Serial No. 635,583, A. J. Moore, filed September 30, 1932, and assigned to the assignees of this application, there is disclosed and broadly claimed a testing and rejecting device for electrically conducting parts employing an ordinary form of Wheatstone bridge, and, therefore, I am not claiming this structure as my invention. However, one of the novel features of my testing and rejecting device is the use of a special form of Wheatstone bridge, and this structure I claim as my invention.

My invention, however, will be understood best from the following description when considered in connection with the accompanying drawing, while those features of my invention which are believed to be novel and patentable are pointed out in the appended claims.

The single figure on the drawing shows a view, partly in perspective and partly in elevation, of a preferred embodiment of my invention. In order to simplify the description of my invention, I will first give a detailed description thereof in connection with its use for testing and rejecting packages of safety razor blades, but I wish it strictly understood that my invention is not limited thereto.

Referring to the drawing, 10 represents an endless conveyor. This conveyor will ordinarily be placed on the peripheries of two rotatably mounted pulleys, but in order to simplify the drawing only one of these pulleys is shown, as represented by 11. Conveyor 10 is driven by any suitable means (not shown) so that its top side runs in the direction shown by arrow 12. The outer side of conveyor 10 has a plurality of raised sections, represented by 13, the distance between the adjacent edges of two consecutive sections 13 being slightly greater than the width of a package of razor blades represented by 14. Packages 14 may be placed on the top side of conveyor 10 between sections 13 by any suitable means. For the sake of illustration the following means are shown. A hollow rectangular receptacle 15 having an open bottom is filled with a large quantity of packages 14 and is so positioned above the top side of conveyor 10 that the distance from the bottom edge of the receptacle to the bottom of a section 13 is slightly greater than the thickness of a package 14. The thickness of sections 13 is such that the distance from the top of a section to the bottom edge of receptacle 15 is slightly less than the thickness of a package 14. When a section 13 is under the bottom opening of receptacle 15, the bottom package in the receptacle is partly inside and partly outside the receptacle and, therefore, cannot be deposited on conveyor 10; but when the adjacent edges of two successive sections 13 are substantially in line with the extremities of the bottom opening of the receptacle, the bottom package therein is free to move completely out of the receptacle and be deposited on the conveyor between these two sections; hence, it should be obvious that one package at a time will be deposited between successive sections 13 during the continuous movement of conveyor 10.

An air core solenoid 16 is adapted to receive as its core a standard package containing the right number of blades. This standard package is represented by 17 and is shown within solenoid 16. A solenoid 18 is adapted to receive as its core the conveyor 10 and a package 14 thereon, the solenoid encircling the conveyor so that the latter with the packages thereon pass therethrough. Solenoid 18 is shown cut away in order to give a clear view of the conveyor and package passing therethrough, but actually the solenoid is similar to solenoid 16 and completely encircles the conveyor. Solenoids 16 and 18 form two arms of a Wheatstone bridge circuit, the other two arms consisting of resistances 19 and 20, which are preferably, though not necessarily, made adjustable. The Wheatstone bridge circuit is energized from an alternating current source 21 through a transformer 22 whenever a pair of normally open contacts 23 are short-circuited. Conveyor 10 carries a switch member 24 for each packages thereon, the spacing between adjacent switch members being substantially the same as that between the centers of adjacent packages 14 on the conveyor. The position of contacts 23 and the length of switch members 24 are so selected that these contacts are short-circuited by a switch member 24 when a package 14 passes through its testing position in solenoid 18. By the term "testing position", I mean either a single position or a plurality of successive positions which a package 14 occupies when passing through solenoid 18. For example, as actually constructed and used solenoid 18 is about ⅜" wider than a package 14, and the length of switch members 24 and the position of contacts 23 are so selected that a switch member 24 engages these contacts slightly after all of the package has entered the solenoid and breaks engagement with these contacts slightly before the package begins to come out of the solenoid, hence the Wheatstone bridge circuit is energized and the package is being tested during the period it is occupying successive positions as it travels approximately ¼" inside of the solenoid. I have found this period to be sufficiently long to give entirely satisfactory operation of the apparatus even with fast moving conveyors. The difference of potential across the Wheatstone bridge circuit, caused by an unbalance thereof, is impressed on a direct current contact making micro-ammeter 25 which is connected across points 26 and 27 of the bridge circuit, a suitable full wave rectifier 28 being interposed to convert the alternating current into direct current. Ammeter 25 has a pivotally mounted movable pointer 29 adapted to sweep over a graduated scale 30, the pointer being biased to assume the normally stationary position shown when no current flows through the ammeter. Pointer 29 is of metal and has a metallic arm 31 adapted to dip into a cup 32 filled with some electrically conducting fluid 33, as, for example, mercury. The remaining details of construction of micro-ammeter 25 are not shown as they are well known to those skilled in the art. A relay 34 has a pair of normally open contacts 35 and its winding is energized from source 21 through a transformer 36 and a suitable full wave rectifier 37, the circuit being completed whenever arm 31 contacts with conducting fluid 33.

A rod 38 is so positioned adjacent to conveyor 10 that when it is moved toward the latter it ejects a package therefrom in the path of its travel. This rod is secured to one end of a movable core 39 of a solenoid 40, the other end of the core being secured to a helical spring 41 which is secured to some stationary part. A coil 42 is so positioned around a portion of core 39 that the energization of the coil sucks the core in far enough so that rod 38 will eject a package 14 from conveyor 10, if the package is in its path of travel. Secured to one end of core 39 is a switch blade 43 adapted to slide on two stationary contacts 44.

The length of contacts 44 and the relative positions of core 39 and coil 42 are such that when the latter is energized it sucks the core in far enough to cause blade 43 to break engagement with contacts 44, but this does not occur until rod 38 has traveled far enough to eject a package from the conveyor, if the package is in its path of travel. A pair of normally open contacts 45 are positioned so as to be consecutively short-circuited by successive switch members 24. These contacts and electromagnet 40 are so positioned that after a package 14 has passed through solenoid 18 it comes in front of rod 38 so as to be in its path of travel before the next package enters the solenoid, and at the same time that a package is in front of rod 38 the contacts 45 are short-circuited by a switch member 24. A relay 46 has a pair of normally open contacts 47 and a winding which has one terminal connected to a lead 48, and its other terminal may be connected to a lead 49, either through contacts 35 of relay 34, or through contacts 44 and its own contacts 47. Leads 48 and 49 are respectively connected to the two lines of source 21. A manually operated normally open switch 50 is shown for short-circuiting contacts 23, the object of this switch being described later.

A description of the operation of the above apparatus follows: Assume that each package 14 is supposed to contain five razor blades and it is desired to eject from the conveyor every package containing more or less than five blades. A package known to contain five blades is inserted into solenoid 16 as represented by the standard package 17. Another package known to contain five blades is placed on the conveyor between two of its sections 13 and the conveyor brought to a stationary position with this package in its testing position within solenoid 18. Resistances 19 and 20 are then adjusted so that the Wheatstone bridge is balanced, or substantially balanced, so that no voltage, or practically no voltage, is impressed on instrument 25, and cup 32 is adjusted so that arm 31 does not contact with fluid 33 but on moving slightly downward the arm will dip into the fluid. Once this adjustment is made there should be no further need of adjusting resistances 19 and 20; in fact, it is readily possible to use nonadjustable resistances 19 and 20 by suitably proportioning the arms of the bridge circuit so that when the packages in the two solenoids contain the same number of blades the bridge is balanced. The package in solenoid 18 may now be removed and the conveyor started.

Before a package 14 reaches the testing position in solenoid 18, the contacts 23 are open circuited (switch 50 being open), hence the Wheatstone bridge circuit is not energized and arm 31 does not contact with fluid 33. Relays 34 and 46 and solenoid 40, therefore, remain inoperative, since the connections are so arranged that neither of them can operate until arm 31 first contacts with fluid 33. Now assume that a package 14 containing five blades enters solenoid 18. While the package is passing through its testing position in the solenoid the contacts 23 are short-circuited by a switch member 24 and the Wheatstone bridge circuit is energized. However, since this package 14 contains five blades, the bridge circuit is balanced and arm 31 does not contact with fluid 33, hence relays 34 and 46 and solenoid 40 remain inoperative. After this package has passed through solenoid 18 it comes in front of rod 38, and while it is in front of the rod the contacts 45 are short-circuited by a switch member 24. This connects one terminal of coil 42 to one line of source 21 through lead 48, but the other terminal of the coil cannot be connected to lead 49 unless contacts 47 are closed, or unless contacts 44 and 35 are both closed, and since contacts 35 and 47 are both open the coil 42 is not energized by the short-circuiting of contacts 45 and this package 14 is not ejected from the conveyor 10. If, however, this package contains more or less than five blades, as, for example, four or six, the Wheatstone bridge circuit will be unbalanced during the period the package passes through its testing position in solenoid 18 because of the changed inductance of solenoid 18, and the voltage impressed on instrument 25 will be sufficient to cause its arm 31 to dip into fluid 33, thus effecting the energization of relay 34 which closes its contacts 35. The closing of contacts 35 does not per se effect the energization of coil 42 because contacts 45 are open, but it does effect the energization of relay 46 which closes its contacts 47. The closing of contacts 47 of relay 46 establishes a holding circuit for the winding of this relay, this circuit being from one line of source 21 through lead 48, the winding of this relay, contacts 44, its own contacts 47 and lead 49 to the other line of source 21. As soon as this package 14 has passed through its testing position in solenoid 18, the contacts 23 are opened, the Wheatstone bridge circuit is deenergized, arm 31 breaks contact with fluid 33, relay 34 is deenergized, and the latter opens its contacts 35. The opening of contacts 35 does not, however, effect the deenergization of relay 46, because the latter remains energized through its previously described holding circuit. When package 14 has been advanced far enough so that it is in front of rod 38, the contacts 45 are short-circuited by a switch member 24, thus effecting the energization of coil 42, the energizing circuit being from one line of source 21, through lead 48, contacts 45, coil 42, contacts 47 and lead 49 to the other line of source 21. The energization of coil 42 actuates rod 38 and the latter ejects this package 14 from the conveyor. When rod 38 has moved far enough to eject the package 14 from the conveyor, the switch blade 43 breaks engagement with contacts 44, thus opening the holding circuit for the winding of relay 46, and the latter opens its contacts 47. The opening of contacts 47 opens the circuit of coil 42, thus effecting the deenergization of the latter, and rod 38 returns to its normal position due to the tension of spring 41. The instrument 25, relays 34 and 46, and electromagnet 40 are now back to their normal positions as shown and are ready for operation when another package containing the wrong number of blades comes along on the conveyor. This operation of the apparatus will be true with every package on the conveyor, hence it should be obvious that the above described apparatus will successively test the packages on a continuously moving conveyor and will automatically reject each package containing more or less than five blades.

Now assume that it is desired to test packages containing a different number of blades than five, as, for example, ten, and to reject every package containing more or less than ten blades. It is unnecessary to readjust the Wheatstone bridge circuit, or to make any changes in the apparatus to achieve these results. It is only necessary to remove package 17 from solenoid 16 and insert therein another package known to contain ten blades. From the previous explanation it will be clear that if a package 14 containing ten blades passes through the testing position in solenoid 18, the Wheatstone bridge circuit will be balanced, arm 31 will not contact with fluid 33, and the package will not be ejected from the conveyor; but if a package containing more or less than ten blades passes through the testing position in solenoid 18, the Wheatstone bridge circuit will be unbalanced, arm 31 will dip into fluid 33, and the package will be ejected from the conveyor. It should now be obvious that my apparatus electrically compares each package 14 with a standard package containing the right number of blades; hence, packages containing any number of blades can be tested without making any further adjustments of the Wheatstone bridge, or making any other change except that of inserting into solenoid 16 a package containing the number of blades that it is desired each package 14 should contain. This not only saves the time which otherwise would have to be spent in readjusting the apparatus each time it is desired to test packages containing a different number of blades than that contained in the packages previously tested, but also makes it readily possible for any unskilled operator to effect this changeover, since once the bridge is adjusted it requires no skill to remove one package from solenoid 16 and insert therein another package containing a different number of blades.

It will be understood, of course, that a suitable receptacle is provided for receiving the packages containing the right number of blades when they leave the conveyor, and a suitable receptacle is provided for receiving the packages containing the wrong number of blades when they are ejected from the conveyor. I have not shown such receptacles, because their arrangement is immaterial to my invention, and because their omission from the drawing simplifies the latter.

Now, assume that instead of testing and sorting packages for the number of magnetic parts contained therein it is desired to test and sort magnetic parts in accordance with their permeabilities. For example, assume that 14 represents magnetic parts and it is desired to test these parts for their permeabilities and to reject automatically any part whose permeability differs more than a predetermined amount from that of a standard magnetic part. To accomplish this it is only necessary to remove package 17 from solenoid 16 and to insert therein the standard magnetic part. From the explanation given in connection with the packages of razor blades, it will be obvious that if a magnetic part 14 having a permeability which differs not more than a predetermined amount from that of the standard part passes through the testing position in solenoid 18, the bridge circuit will not be unbalanced sufficiently to cause arm 31 to contact with fluid 33, hence the tested part 14 will not be rejected from the conveyor. If, however, a magnetic part having a permeability which differs by more than a predetermined amount from that of the standard part passes through the testing position in the solenoid, the bridge circuit will be unbalanced sufficiently to cause arm 31 to contact with fluid 33, hence the tested part 14 will be ejected from the conveyor.

Now, assume that it is desired to test and sort magnetic or non-magnetic metallic parts, or other electrically conducting parts, as for example, carbon, in accordance with their chemical compositions, or in accordance with their mechanical dimensions. For example, first assume that 14 represents electrically conducting parts that have the same mechanical dimensions but whose chemical compositions may vary, and it is desired to test these parts for their chemical compositions and to reject automatically any part whose chemical composition differs more than a predetermined amount from that of a standard part. To accomplish this it is only necessary to remove whatever part is now in solenoid 16 and to insert therein this standard part having the correct chemical composition. It is clear that since the mechanical dimensions of parts 14 are the same the electrical resistance of each part will depend on its chemical composition. Next, assume that 14 represents electrically conducting parts that have the same chemical composition but whose mechanical dimensions may vary and it is desired to test these parts for their mechanical dimensions and to reject automatically any part whose mechanical dimensions differ more than a predetermined amount from that of a standard part. To accomplish this it is only necessary to remove whatever part is now in solenoid 16 and to insert therein the standard part having the correct mechanical dimensions. It is clear that since the chemical compositions of parts 14 are the same the electrical resistance of each part will depend on its mechanical dimensions. It should also be clear that when a part 14 passes through the testing position in solenoid 18 it serves as the short-circuited secondary of a transformer whose primary winding is the winding of solenoid 18. The impedance of the primary winding of a transformer increases when the impedance of its secondary winding is increased, and vice-versa; hence, the electrical resistance of a part 14 passing through the testing position in solenoid 18 not only determines its own impedance but also determines the impedance of this solenoid and, therefore, determines the difference of potential across the Wheatstone bridge, due to an unbalance thereof. From the explanations previously given it should be obvious that the apparatus will test and automatically reject any part 14 whose chemical composition differs more than a predetermined amount from that of a standard part in solenoid 16, and will also reject any part 14 whose mechanical dimensions differ more than a predetermined amount from that of standard part in solenoid 16.

From the previous explanations it should be obvious that if 14 represents packages each of which contains a number of electrically conducting parts, metallic or non-metallic, magnetic or non-magnetic, the parts in each package passing through the testing position in solenoid 18 will act as short-circuited secondaries of a transformer and thus determine the unbalanced bridge voltage; hence, by putting a standard package in solenoid 16 the apparatus will test and automatically reject from the conveyor each package containing a number of parts different from that in the standard package. It should also be obvious that if 14 represents a plurality of electrically conducting parts, metallic or non-metallic, magnetic or non-magnetic, the parts grouped into one mass and not confined within a package, the apparatus will test and automatically reject from the conveyor each mass containing a number of parts different from that in a standard mass of parts inserted in solenoid 16, or having a different permeability or other physical characteristic different from that of the standard mass.

Now, assume that it is desired to dispense with the automatic testing and rejecting feature and only determine the number of parts that are grouped into one mass, whether or not they are confined within a package, or only determine the variation in magnetic permeability, or chemical composition, or mechanical dimensions of each part 14 from that of a standard part. In those cases all of the apparatus can be dispensed with except the Wheatstone bridge circuit, instrument 25, rectifier 28, and switch 50. If, for example, 14 represents packages of blades, the scale of instrument 25 will be graduated and will, for example, also have 0, 5, 10, etc., marked thereon. If packages 14 are supposed to contain five blades, for example, a package known to contain five blades will be inserted into solenoid 16 and another package known to contain five blades will be inserted into solenoid 18. Switch 50 is then closed and resistances 19 and 20 adjusted so that the Wheatstone bridge is sufficiently unbalanced to cause instrument 25 to indicate 5. Once this adjustment is made there should be no further need of adjusting resistances 19 and 20; in fact, it is readily possible to use non-adjustable resistances 19 and 20 by suitably proportioning the arms of the bridge circuit. The operator may now remove from solenoid 18 the package known to contain five blades, manually feed one package 14 at a time into the solenoid and read on scale 30 the number of blades in the package. It is obvious that if the number of blades in a package 14 is more or less than five the changed inductance of solenoid 18 will change the unbalanced bridge voltage so that instrument 25 indicates above 5 for more than five blades and below 5 for less than five blades. By suitably marking scale 30 the operator can read the correct number of blades in each package being tested. The same results can obviously be obtained when packages 14 contain non-magnetic metallic parts instead of magnetic parts, or contain non-metallic electrically conducting parts, and also when 14 represents a plurality of electrically conducting parts, metallic or non-metallic, magnetic or non-magnetic grouped into one mass and not confined within a package.

Suppose, however, that 14 represents electrically conducting parts and it is desired to have instrument 25 indicate the difference in the magnetic permeability, chemical composition, or mechanical dimensions from that of a standard part inserted in solenoid 16. In that case, if instrument 25 indicates 5 when a part 14 is inserted into solenoid 18 it shows that the particular characteristic under investigation of the part being tested is the same as that of the standard part in solenoid 16. If, however, instrument 25 indicates below 5, it shows that the characteristic of the part being tested differs in one direction from that of the standard part, whereas if instrument 25 indicates above 5 it shows that the characteristic of the part being tested differs in the opposite direction from that of the standard part. Of course, scale 30 of instrument 25 can have on its face any other series of numbers or figures correlated to the particular characteristic under investigation of the parts being tested.

Since my apparatus is capable of performing the operations described herein on a metallic or non-metallic electrically conducting part and/or on a plurality of metallic or non-metallic electrically conducting parts grouped into one mass, I wish it understood that wherever I employ the term "metallic part" or "electrically conducting part" in the claims, I mean not only a single part but I also mean a plurality of parts grouped into one mass whether or not they are confined within a package; and I also wish it understood that wherever I employ in the claims the term "particular characteristic under investigation", I not only mean the testing of an electrically conducting part for its chemical composition, or for its magnetic permeability, or for its mechanical dimensions, but I also mean the testing of a plurality of such parts grouped into one mass for its quantity, whether or not the parts are confined within a package.

In concluding, I wish to point out four outstanding advantages of my invention in addition to those hereinbefore mentioned. These are:

1. Very high sensitivity. By suitably proportioning the arms of the Wheatstone bridge circuit it is readily possible to detect a very slight difference between the chemical composition or the physical characteristic of an electrically conducting part and that of a standard part, and/or to detect the smallest difference between the number of electrically conducting parts grouped in a mass and the number of parts the mass should contain.

2. Reliability and uniformity of operation. By employing a Wheatstone bridge circuit the operation of the apparatus is substantially independent of frequency variations and the ordinary voltage variations of the A. C. source 21.

3. Simplicity of testing apparatus. The Wheatstone bridge circuit may be connected directly to any A. C. source of suitable voltage and frequency without employing any regulating device therefor.

4. Continuity of operation. The testing and rejecting operations can be performed with a continuously moving conveyor, thus permitting the conveyor to be operated at its optimum speed to satisfy manufacturing requirements.

An arrangement substantially as shown in the drawing has been installed in the plant of an internationally known manufacturer of safety razor blades for automatically testing packages of blades and rejecting each package containing the wrong number of blades. This arrangement has been in actual operation for nearly a year and has given very satisfactory operating results.

In accordance with the provisions of the patent statutes, I have described the principles of operation of my invention, together with the apparatus which I now consider to represent the best embodiment thereof, but I desire to have it understood that the apparatus shown and described is only illustrative and that the invention may be carried out by other means.

What I claim as new and desire to secure by Letters Patent of the United States, is:

1. A testing and rejecting device for a plurality of parts carried in spaced relationship by a continuously moving conveyer, said device comprising an electrical impedance element adapted when energized to produce flux lines and having as a part of its flux circuit an air gap adapted to receive the part to be tested, said impedance element being so positioned that the parts carried by said conveyer consecutively pass through said air gap, a movable member for rejecting a tested part from its normal course of travel after leaving said air gap, said movable member being so positioned that after one of said parts passes through said air gap it passes in front of this member before the next following part reaches the testing position in said air gap, electromagnetic means for actuating said movable member, a pair of normally open contacts, a relay having a pair of normally open contacts, an electrical circuit including both of said pairs of contacts for effecting the energization of said electromagnetic means when both pairs of contacts are closed, means responsive to the movement of said conveyer for effecting the energization of said impedance element by alternating current during a predetermined period as each of said parts passes through said air gap, means responsive to the current flowing in said impedance element for effecting the operation of said relay when the particular characteristic under investigation of a part passing through said air gap is appreciably different from that of a standard part, means responsive to the operation of said relay and to the inoperative position of said movable member for maintaining the relay contacts closed after said impedance element is deenergized, and means responsive to the movement of said conveyer for effecting the closing of the first mentioned pair of contacts when a tested part is in front of said movable member.

2. A testing and rejecting device for a plurality of parts carried in spaced relationship by a continuously moving conveyer, said device comprising an electrical impedance element adapted when energized to produce flux lines and having as a part of its flux circuit an air gap adapted to receive the part to be tested, said impedance element being so positioned that the parts carried by said conveyer consecutively pass through its air gap, a movable member for ejecting a tested part from its normal course of travel after leaving said air gap, said movable member being so positioned that after a part pases through said air gap it passes in front of this member before the next following part reaches the testing position in said air gap, electromagnetic means for actuating said movable member, a movable switch member for each of said parts carried by said conveyer, means for driving said switch members at the speed of said conveyer, means including a pair of normally open contacts for effecting the energization of said impedance element by alternating current when these contacts are closed, means including a second and a third pair of normally open contacts for effecting the energization of said electromagnetic means when both of these pairs of contacts are closed, the first mentioned pair of contacts being so positioned that when one of said parts passes through the testing position in said air gap its corresponding switch member engages these contacts for a predetermined period and then breaks this engagement before the next following part reaches the testing position in said air gap, and the second mentioned pair of contacts being so positioned that when a tested part is in front of said movable member its corresponding switch member engages these contacts, and means responsive to the current flowing in said impedance element for effecting the closing of the third mentioned pair of contacts when the particular characteristics under investigation of the part passing through said air gap is appreciably different from that of a standard part.

3. A testing and rejecting device for a plurality of electrically conducting parts carried in spaced relationship by a continuously moving conveyor, said device comprising a Wheatstone bridge circuit having an electromagnet connected in one of its arms, said electromagnet having as a portion of its magnetic circuit an air gap adapted to receive an electrically conducting part carried by said conveyor, said electromagnet being so positioned that the electrically conducting parts carried by said conveyor consecutively pass through its air gap, a movable member for ejecting a tested electrically conducting part from its normal course of travel after leaving said air gap, said movable member being so positioned that after an electrically conducting part passes through said air gap it passes in front of this member before the following electrically conducting part reaches the testing position in said air gap, electromagnetic means for actuating said movable member, a pair of normally open contacts, a relay having a pair of normally open contacts, an electrical circuit including both of said pairs of contacts for effecting the energization of said electromagnetic means when both pairs of contacts are closed, means responsive to the movement of said conveyor for effecting the energization of said bridge circuit by alternating current during a predetermined period as each electrically conducting part passes through said air gap, means responsive to the difference of potential across said bridge circuit, caused by an unbalance thereof, for effecting the operation of said relay when the particular characteristic under investigation of an electrically conducting part passing through said air gap is appreciably different from that of a standard electrically conducting part, means responsive to the operation of said relay and to the inoperative position of said movable member for maintaining the relay contacts closed after said bridge circuit is deenergized, and means responsive to the movement of said conveyor for effecting the closing of the first mentioned pair of contacts when a tested electrically conducting part is in front of said movable member.

4. A testing and rejecting device for a plurality of electrically conducting parts carried in spaced relationship by a continuously moving conveyor, said device comprising a Wheatstone bridge circuit having an electromagnet connected in one of its arms, said electromagnet having as a portion of its magnetic circuit an air gap adapted to receive an electrically conducting part carried by said conveyor, said electromagnet being so positioned that the electrically conducting parts carried by said conveyor consecutively pass through its air gap, a movable member for ejecting a tested electrically conducting part from its normal course of travel after leaving said air gap, said movable member being so positioned that after an electrically conducting part passes through said air gap it passes in front of this member before the following electrically conducting part reaches the testing position in said air gap, electromagnetic means for actuating said movable member, a movable switch member for each electrically conducting part carried by said conveyor, means for driving said switch members at the speed of said conveyor, means including a pair of normally open contacts for effecting the energization of said bridge circuit by alternating current when these contacts are closed, means including a second and a third pair of normally open contacts for effecting the energization of said electromagnetic means when both of these pairs of contacts are closed, the first mentioned pair of contacts being so positioned that when an electrically conducting part passes through the testing position in said air gap its corresponding switch member engages these contacts for a predetermined period and then breaks this engagement before the following electrically conducting part reaches the testing position in said air gap, and the second mentioned pair of contacts being so positioned that when a tested electrically conducting part is in front of said movable member its corresponding switch member engages these contacts, and means responsive to the difference of potential across said bridge circuit, caused by an unbalance thereof, for effecting the closing of the third mentioned pair of contacts when the particular characteristic under investigation of the electrically conducting part passing through said air gap is appreciably different from that of a standard electrically conducting part.

5. A testing and rejecting device for a plurality of packages carried in spaced relationship by a continuously moving conveyor, each package containing at least one electrically conducting part, said device comprising a Wheatstone bridge circuit having two air core solenoids respectively connected in two of its arms, one solenoid being adapted to receive as its core a standard package containing a predetermined number of electrically conducting parts and the second solenoid being adapted to receive as its core a package carried by said conveyor, the last mentioned solenoid being so positioned that the packages carried by said conveyor consecutively pass therethrough, an electromagnet having a movable plunger adjacent to said conveyor for ejecting therefrom a tested package, said electromagnet being so positioned that after a package passes through said second solenoid it passes in front of the plunger before the following package reaches the testing position in this solenoid, means responsive to the operation of said conveyor for effecting the energization of said bridge circuit by alternating current for a predetermined period as each package passes through said second solenoid, means including two pairs of normally open contacts for effecting the operation of said electromagnet when both pairs of contacts are closed, a relay for closing one of said two pairs of contacts, electroresponsive means having a movable element whose position varies in accordance with the voltage impressed on the electroresponsive means, means including said movable element for effecting the operation of said relay when the movable element is in a predetermined position, connecting means between said bridge circuit and said electroresponsive means for impressing on the latter a voltage whose magnitude is responsive to the difference of potential across the bridge circuit, caused by an unbalance thereof, and means responsive to the operation of said conveyor for effecting the closing of the other of said two pairs of contacts when a tested package is in front of said movable plunger.

6. A testing and rejecting device for a plurality of packages carried in spaced relationship by a continuously moving conveyor, each package containing at least one metallic part, said device comprising a Wheatstone bridge circuit having two air core solenoids respectively connected in two of its arms, one solenoid being adapted to receive as its core a standard package containing a predetermined number of metallic parts and the second solenoid being adapted to receive as its core a package carried by said conveyor, the last mentioned solenoid being so positioned that the packages carried by said conveyor consecutively pass therethrough, an electromagnet having a movable plunger adjacent to said conveyor for ejecting therefrom a tested package, said electromagnet being so positioned that each package passing through said second solenoid passes in front of the plunger before the following package reaches the testing position in this solenoid, a switch member carried by said conveyor for each package carried thereby, means including a pair of normally open contacts for effecting the energization of said bridge circuit by alternating current when these contacts are closed, means including a second and a third pair of normally open contacts for effecting the energization of said electromagnet when both of these pairs of contacts are closed, the first mentioned pair of contacts being so positioned that when a package passes through the testing position in said second solenoid its corresponding switch member engages these contacts for a predetermined period and breaks this engagement before the following package reaches the testing position in this solenoid, and the second mentioned pair of contacts being so positioned that when a tested package is in front of said plunger its corresponding switch member engages these contacts, a relay for closing the third mentioned pair of contacts, said relay having a winding, a pair of contacts arranged to be closed by said plunger when the latter is in its inoperative position, a relay having a pair of normally open contacts, connecting means including the third, fourth, and fifth mentioned pairs of contacts and said relay winding for effecting the initial energization of the latter when the fifth mentioned pair of contacts are closed and for maintaining said relay winding energized when the third and fourth mentioned pairs of contacts are closed and the fifth mentioned pair of contacts are open, electroresponsive means having a movable element whose position varies in accordance with the voltage impressed on the electroresponsive means, means including said movable element for effecting the operation of the second mentioned relay when the movable element is in a predetermined position, and connecting means between said bridge circuit and said electroresponsive means for impressing on the latter a voltage whose magnitude is responsive to the difference of potential across the bridge circuit, caused by an unbalance thereof.

ALFRED V. MERSHON.